(12) United States Patent
Schulz et al.

(10) Patent No.: US 11,331,884 B2
(45) Date of Patent: May 17, 2022

(54) DECORATIVE DESIGN ELEMENT IN BLACK PRINT

(71) Applicant: SAINT-GOBAIN GLASS FRANCE, Courbevoie (FR)

(72) Inventors: Valentin Schulz, Niederzier (DE); Michael Kolf, Eschweiler (DE); Sebastian Schurse, Übach-Palenberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 15 days.

(21) Appl. No.: 16/979,414

(22) PCT Filed: Jul. 22, 2019

(86) PCT No.: PCT/EP2019/069628
§ 371 (c)(1),
(2) Date: Sep. 9, 2020

(87) PCT Pub. No.: WO2020/020806
PCT Pub. Date: Jan. 30, 2020

(65) Prior Publication Data
US 2021/0078297 A1  Mar. 18, 2021

(30) Foreign Application Priority Data
Jul. 26, 2018  (EP) .................................. 18185732

(51) Int. Cl.
*B32B 7/06* (2019.01)
*B32B 17/10* (2006.01)
(Continued)

(52) U.S. Cl.
CPC .. *B32B 17/10357* (2013.01); *B32B 17/10036* (2013.01); *B32B 17/1099* (2013.01);
(Continued)

(58) Field of Classification Search
CPC ............... B32B 7/12; B32B 17/10005; B32B 17/10036; B32B 2329/06; B60J 1/00; B60J 1/02; B60J 1/001; B60J 1/18
See application file for complete search history.

(56) References Cited

U.S. PATENT DOCUMENTS

| 6,824,868 | B2 * | 11/2004 | Bell ........................ B32B 27/36 428/343 |
| 2006/0078716 | A1 * | 4/2006 | Yacovone ......... B32B 17/10284 428/210 |

(Continued)

FOREIGN PATENT DOCUMENTS

DE    10 2008 017895 A1    10/2009

OTHER PUBLICATIONS

International Search Report as issued in International Patent Application No. PCT/EP2019/069628, dated Sep. 18, 2019.

*Primary Examiner* — Elizabeth E Mulvaney
(74) *Attorney, Agent, or Firm* — Pillsbury Winthrop Shaw Pittman LLP

(57) ABSTRACT

A laminated glass, includes an outer pane, an inner pane, at least two lamination layers arranged between the outer pane and the inner pane, and at least one design element, wherein the design element is formed on a partial region of a pane side of the outer pane or the inner pane from a pictorial black print having one or a plurality of unprinted regions, and an opaque, non-black underlay is arranged between the two lamination layers, which underlay is placed underneath the unprinted region(s) of the design element. The laminated glass has a design element with good contrast and good visibility and is suitable in particular as a vehicle window.

19 Claims, 3 Drawing Sheets

Figure 1:

(51) Int. Cl.
  *B32B 27/08* (2006.01)
  *B32B 27/30* (2006.01)
  *B32B 27/36* (2006.01)
  *B32B 37/06* (2006.01)
  *B32B 37/18* (2006.01)
  *B32B 38/00* (2006.01)

(52) U.S. Cl.
  CPC .. *B32B 17/10247* (2013.01); *B32B 17/10266* (2013.01); *B32B 17/10293* (2013.01); *B32B 17/10348* (2013.01); *B32B 17/10761* (2013.01); *B32B 17/10779* (2013.01); *B32B 17/10935* (2013.01); *B32B 27/08* (2013.01); *B32B 27/30* (2013.01); *B32B 27/36* (2013.01); *B32B 37/06* (2013.01); *B32B 37/182* (2013.01); *B32B 38/145* (2013.01); *B32B 2250/05* (2013.01); *B32B 2250/40* (2013.01); *B32B 2255/20* (2013.01); *B32B 2305/34* (2013.01); *B32B 2307/4023* (2013.01); *B32B 2307/41* (2013.01); *B32B 2307/412* (2013.01); *B32B 2315/02* (2013.01); *B32B 2315/08* (2013.01); *B32B 2329/06* (2013.01); *B32B 2367/00* (2013.01); *B32B 2419/00* (2013.01); *B32B 2605/006* (2013.01); *B32B 2605/08* (2013.01)

(56) References Cited

U.S. PATENT DOCUMENTS

2008/0014414 A1  1/2008  Yacovone
2014/0355106 A1  12/2014 Laluet et al.

\* cited by examiner

DECORATIVE DESIGN ELEMENT IN BLACK PRINT

CROSS-REFERENCE TO RELATED APPLICATIONS

This application is the U.S. National Stage of PCT/EP2019/069628, filed Jul. 22, 2019, which in turn claims priority to European patent application number 18185732.7 filed Jul. 26, 2018. The content of these applications are incorporated herein by reference in their entireties.

The invention relates to a laminated glass that has a design element and a method for producing this laminated glass. The laminated glass is suitable in particular as a vehicle window.

The use of smart functions, such as a Wi-Fi function, is becoming increasingly important in automobiles. In order to indicate that a vehicle has such a function, a design element is often applied to a window of the vehicle. Other data, such as product information, are also applied as a design element on vehicle windows.

Currently, such design elements on vehicle windows are formed by a black print that has unprinted regions, thus forming an image by black print and unprinted regions. Single panes and laminated glasses that are used as vehicle windows are transparent in accordance with their function. Accordingly, lamination layers used in laminated glasses are transparent or clear. Consequently, the design elements have only low contrast. The result is poor visibility of the design element. This means that the design element can only be seen at all at a short distance quite near the laminated glass.

Methods are known for increasing the contrast in which an additional screen print in a light color is used. However, this requires an additional process step and additional screen printing equipment and is more complicated, cost insensitive, and requires significant changes to existing production lines. Also, the accuracy of the various prints produced can constitute a problem.

Known from DE 10 2008 017 895 A1 is a laminated glass pane in which a negative of the subsequently visible mark is applied by screen printing on the inner side of an outer pane. In the region of the mark, a transparent film is adhered with the adhesive layer that holds the two panes of the laminated glass pane together. Thus, high quality of the mark should be obtained. A disadvantage of this solution is the fact that, during lamination, air inclusions can develop in the region of the transparent film between the transparent film and the pane, adversely affecting the presentation of the mark.

The object of the invention is, consequently, to provide a laminated glass having a design element wherein the design element has greater contrast and, thus, improved visibility. In addition, it should be possible to produce the laminated glass having a design element in a simple and cost-effective manner.

This object was successfully accomplished in particular by incorporating an opaque, non-black underlay into the film composite of the laminated glass to underlay the design element situated on the side of a pane.

The object of the present invention is, consequently, accomplished according to the invention by a laminated glass in accordance with claim 1 and a method for producing the laminated glass in accordance with claim 12. Preferred embodiments are apparent from the dependent claims.

By incorporating the opaque, non-black underlay, it is possible to highlight the unprinted regions of the design element with a strong contrast relative to the black print regions, thus achieving significantly improved visibility of the design element. The strength of the contrast and the appearance of the design element can be adapted as desired through the selection of the color of the underlay. Moreover, this requires a processing measure that is economical and relatively simple to execute that necessitates no major change in existing production lines.

Accordingly, the present invention relates to a laminated glass 18, comprising an outer pane 5, an inner pane 6, at least two lamination layers 7,8 arranged between the outer pane 5 and the inner pane 6, and at least one design element 9, wherein the design element 9 is formed on a partial region of a pane side of the outer pane 5 or the inner pane 6 from a pictorial black print 15 having one or a plurality of unprinted regions 16, and an opaque, non-black underlay 10 is arranged between the two lamination layers 7, 8, which underlay is placed underneath the unprinted region(s) 16 of the design element 9.

Figure 2:
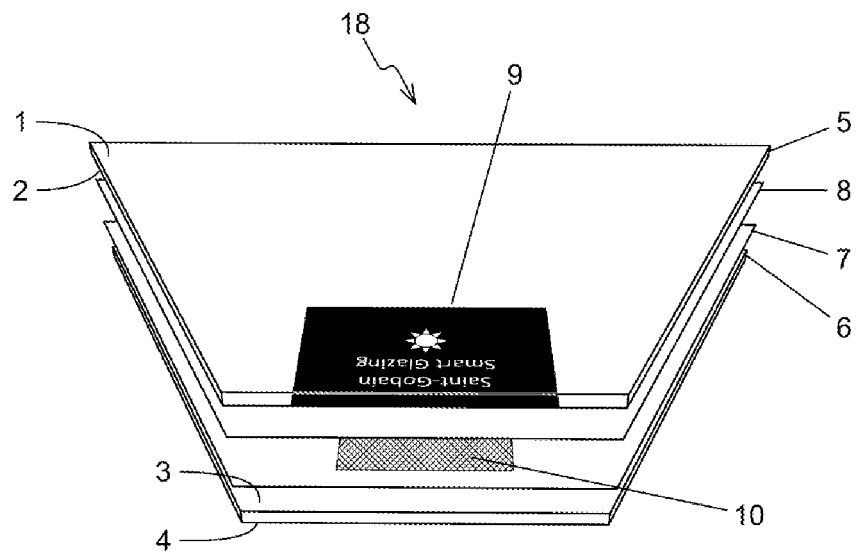
Figure 3:
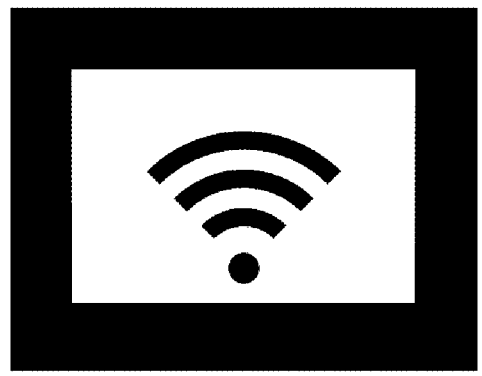

The invention is explained in the following and in the accompanying figures. They depict:

FIG. 1 an example of a design element,

FIG. 2 an exploded view of a laminated glass according to the invention,

FIG. 3 an example of another design element for a Wi-Fi function.

Figure 4:
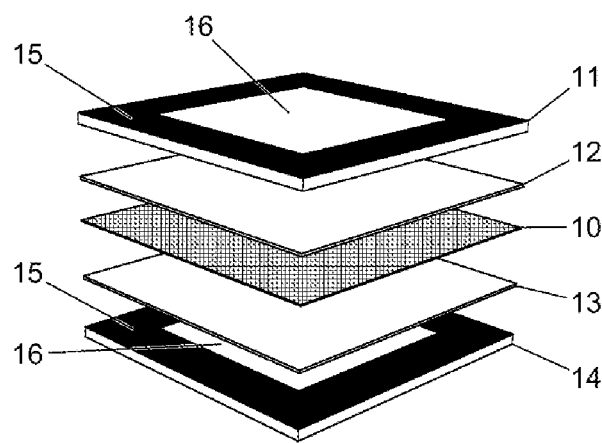
Figure 5:
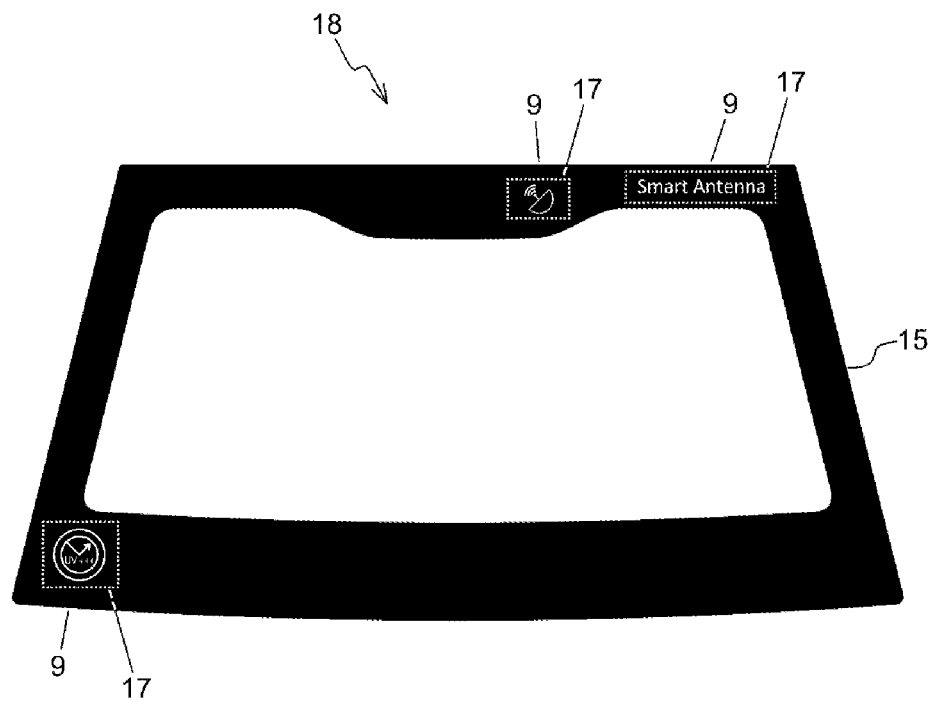

FIG. 4 an exploded view of a detail of another laminated glass according to the invention showing the partial region on which the design element is arranged, FIG. 5 an oblique view of a laminated glass according to the invention with three design elements.

The laminated glass comprises an outer pane and an inner pane that are laminated to form a solid laminate by at least two interposed laminating films.

In the context of the invention, "inner pane" refers to the glass pane which, when installed, e.g., in a vehicle or a building, is intended as the pane of the laminated glass facing the interior, e.g., a vehicle interior or a living space. "Outer pane" refers to the glass pane which, when installed, e.g. in a vehicle or building, is intended as the pane facing the external environment.

The laminated glass, in particular for a vehicle window, can be a flat or curved laminated glass sein. In the case of a flat laminated glass, the inner pane and the outer pane are flat. In the case of a curved laminated glass, the inner pane and the outer pane are curved. Curved laminated glass is, for example, used as a windshield or rear window in vehicles.

The inner pane and the outer pane can be made of the same material or a different material. The inner pane and the outer pane can be made of an inorganic glass and/or an organic glass (polymers), inorganic glass being preferred. In a preferred embodiment, the inner pane and/or the outer pane contains flat glass, quartz glass, borosilicate glass, soda lime glass, alkali aluminosilicate glass, polycarbonate, and/or polymethacrylate. The inner pane and the outer pane are preferably made of soda lime glass.

The inner pane and the outer pane can have the same thickness or different thicknesses. Preferably, the inner pane and the outer pane have, independently of one another, a thickness in the range from 0.4 to 5.0 mm, e.g., 0.4 to 3.9 mm, more preferably 1.6 to 2.5 mm. For mechanical reasons, the outer pane is preferably thicker or the same thickness as the inner pane.

The inner pane and the outer pane can be clear or tinted. Tinted panes are preferably gray or dark gray. The inner pane and the outer pane are preferably clear. Tinted panes are preferably green.

The inner pane and/or the outer pane can have other suitable coatings known per se, e.g., non-stick coatings, tinted coatings, infrared reflecting coatings, e.g., in the form of a metal coating, anti-scratch coatings, or low-E coatings. An example of coated glass is low-E glass (low-emissivity glass).

In a preferred embodiment, both glasses are clear, and the inner side of the outer pane (side 2) or preferably the outer side of the inner pane (side 3) is provided with an infrared reflecting coating, in particular a metal coating. In an alternative embodiment, both glasses are clear; and an infrared reflecting film, in particular a metal-coated film, is provided in the composite.

The laminated glass further comprises two or more lamination layers between the inner pane and the outer pane. The at least two lamination layers can be the same or different. The lamination layers extend substantially over the entire surface of the laminated glass. The following data refer independently of one another to all of these at least two lamination layers, unless otherwise indicated.

The lamination layer is in particular a polymeric lamination layer. Preferably, the lamination layer contains a thermoplastic polymer. Appropriate commercially available laminating films are usually used as the starting material for the formation of the lamination layers. They are used for bonding or laminating the components of the vehicle window to obtain the adhesive glass laminate.

The lamination layer can contain, for example, polyvinyl butyral (PVB), ethylene vinyl acetate, polyurethane, polypropylene, polyacrylate, polyethylene, polycarbonate, polymethyl methacrylate, polyvinyl chloride, polyacetate resin, casting resin, acrylate, fluorinated ethylene propylene, polyvinyl fluoride, and/or ethylene tetrafluoroethylene, and/or a mixture and/or a copolymer thereof. Preferably, the lamination layer contains polyvinyl butyral (PVB), ethylene vinyl acetate, polyurethane, and/or mixtures thereof and/or copolymers thereof, PVB lamination layers being particularly preferred.

The lamination layers, preferably PVB lamination layers, preferably have in each case a thickness of 0.04 to 1.5 mm, more preferably 0.1 to 1.2 mm, even more preferably 0.3 to 0.9 mm.

In particular, the lamination layer arranged between the design element and the underlay is transparent; it can preferably be clear, i.e., colorless, or tinted. Tinted lamination layers are preferably tinted gray, blue, or green. The lamination layer between the design element and the underlay is preferably clear, since this is the best way to highlight the contrast of the design element achieved by the underlay. However, use of a tinted lamination layer is also possible when a specific optical effect is desired for the design element.

The lamination layers that are not arranged between the design element and the underlay are likewise preferably transparent, possibly being clear or tinted. Tinted lamination layers are preferably tinted gray, blue, or green.

The laminated glass has at least one design element. The design element is formed on a partial region of a pane side of the outer pane or the inner pane from a pictorial black print having one or a plurality of unprinted regions.

The pane side of the outer pane or the inner pane can be one or more of the outer side of the outer pane, here, also referred to as "side 1"; the inner side of the outer pane, here, also referred to as "side 2"; the outer side of the inner pane, here, also referred to as "side 3"; and the inner-side of the inner pane, here, also referred to as "side 4".

In preferred embodiments, the pane side onto which the design element is printed is side 2 and/or side 4, with side 2 being the pane side on which the design element is particularly preferably printed.

The design element is formed from a pictorial black print having one or a plurality of unprinted regions. "A pictorial black print having one or a plurality of unprinted regions" means that an image is produced from the combination of one or more regions having a black print and one or more unprinted regions. It is, accordingly, a monochromatic print in which the image of the design element is presented by black colored regions and by blank regions. Such design elements, which are formed from a pictorial black print having one or a plurality of unprinted regions, are known in the art.

The pictorial information can result from the unprinted regions or the black colored regions or a combination thereof. The pictorial black print can be, for example, a stamp print, such as a product stamp, or a negative print, preferably a negative print. The negative print is preferably omitted in the black print.

The representation formed by element can, for example, be letters, symbols, information signs, graphic patterns, a logo, or combinations thereof. The design element can suitably be a decorative design element.

Any black ink can be used for the pictorial black print. Examples include a black print made from black ceramic ink or other black printing inks, with black ceramic ink, also referred to as black enamel ink, preferred. Pictorial black printing is preferably screen printing with a black ceramic ink. This is the customary method in the art.

The laminated glass has, in accordance with its function, a through-vision region in which it has no black print. Usually, the through-vision region of the laminated glass makes up at least 30%, preferably at least 50% of the area of the laminated glass, e.g., in the case of roof panels, it can, however, also be considerably larger at least 70% or at least 80%, e.g., in the case of windshields or rear windows. It goes without saying that the design element is present only on a partial region of the laminated glass and this partial region is outside the through-vision region.

The size of the at least one design element is, in principle, not otherwise restricted. One or a plurality of design elements can be present.

The design element can be arranged at any position of the laminated glass. Preferably, it is situated in the edge region of the laminated glass. It is, however, generally preferred for the design element to be at least 10 mm from the edge of the laminated glass.

The laminated glass according to the invention further includes an opaque, non-black underlay that is arranged between the two lamination layers such that it underlies the unprinted region(s) of the design element. Here, the term "underlies" means that the underlay is situated behind the unprinted region(s) based on the intended viewing direction toward the design element, the intended viewing direction in the case of a design element on a pane side of the outer pane being from the outside in and in the case of a design element on a pane side of the inner pane is from the inside out. In this manner, the underlay is visible through the unprinted regions in the intended viewing direction and provides higher contrast.

Whereas the lamination layers are generally present over the entire region of the laminated glass, the underlay is situated only in a partial region of the laminated glass.

The size of the underlay can be the same as the size of the design element. However, the size of the underlay can also be smaller than the size of the design element, provided that all unprinted regions of the design element can be underlaid by the underlay. The underlay is preferably at least somewhat larger than is necessary for underlying the unprinted regions of the design element. This can be useful to keep any inaccuracies in positioning from directly causing a part of the unprinted regions not to be underlaid by the underlay. A somewhat larger dimension of the underlay can also be expedient because of the better handling of the piece of film forming the underlay. The underlay can, optionally, also be larger than the design element, e.g., when the design element is surrounded by a full-surface black print as described in the following. The underlay should, however, be positioned and dimensioned such that it does not protrude into the through-vision region of the laminated glass.

The size of the underlay thus depends essentially on the size and type of the design element; for example, the area of the underlay must not be more than 70%, preferably not more than 50%, more preferably not more than 20%, and in particular not more than 5%, preferably not more than 2%, of the area of the laminated glass. This also depends on the use of the laminated glass. For example, in the case of a roof panel, relatively large design elements are conceivable, whereas in the case of rear windows or windshields, smaller design elements are more preferable. The number of underlays generally equals the number of design elements present.

The underlay can have any geometry. In practice, for example, rectangular underlays are expedient. However, the geometry can also be adapted to the geometry of the design element and be circular or irregular, for example.

The underlay is a flat material. Since the underlay is arranged in only a partial region of the laminated glass, this results in thickness changes in the laminated glass. In order to avoid excessive thickness changes in the laminated glass, the underlay should not be too thick. On the other hand, difficulties in the handling of the piece film forming the underlay can arise if the underlay is too thin.

Consequently, it is generally expedient for the underlay to have a thickness in the range from 1 to 120 μm, preferably 10 to 100 μm, and more preferably 20 to 70 μm.

The underlay is opaque and has a non-black color. The color of the underlay can be selected as required. All non-black colors are conceivable. Preferably selected is a color that has a high contrast relative to the black print. The opaque underlay is particularly preferably white. A white underlay yields the strongest contrast, thus optimizing the visibility of the design element.

The opaque underlay is preferably a plastic underlay, in particular a flat plastic underlay. This is usually formed from an appropriate piece of film. The plastic underlay usually contains coloring agents, e.g., pigments, to achieve opacity and color.

The opaque underlay can, for example, be formed from a polymer, in particular a thermoplastic polymer, such as polyethylene terephthalate (PET), which is the primary component or the only component of the underlay matrix. In addition to the polymers mentioned, the underlay can contain other polymers and additives, as are customary in the sector. Examples of additives include coloring agents, such as pigments, UV protection agents, fillers, and the like. As stated above, the underlay usually contains coloring agents, e.g. pigments, to achieve opacity and color.

The opaque, non-black underlay is particularly preferably formed from PET, a white PET underlay being particularly preferred. PET underlays are particularly preferred since thin PET films are available in the range of the desired underlay thickness and PET has good compatibility with the lamination layers, in particular the PVB lamination layers.

The laminated glass can also have a full-surface black print, preferably formed at the side edge of the laminated glass and preferably running around the entire side edge of the laminated glass. Laminated glasses, in particular laminated glasses for vehicle windows, are frequently provided with a full-surface black print at the side edge to optically conceal certain elements required for installation in a vehicle or building, such as adhesive connections.

The full-surface black printing can be carried out with the same methods and the same printing inks that are also described here for the pictorial black print, to which reference is made here. Screen printing with black ceramic inks is likewise common and preferred for forming the full-surface black print.

In a preferred embodiment, the design element is surrounded by a full-surface black print, with the full-surface black print preferably formed in an edge region of the laminated glass, with the full-surface black print particularly preferably running around the entire edge region of the laminated glass. In this case as well, it is generally preferred for the design element to be at least 10 mm from the edge of the laminated glass. When the design element is contained in a full-surface black print, it is usually expedient to print the design element and the full-surface black print in one step on the same pane side, the pane side preferably being side 2 and/or side 4, more preferably side 2.

In a preferred embodiment, the pane that is opposite the pane having the design element has, in a position congruent with the design element, the same design element, a different design element, or a full-surface black print. This is advantageous in order to obscure the view of the opaque underlay from the viewing direction that is not the intended viewing direction for the sign element. In the case of an identical or different design element on the opposing pane, it is also possible to view the design element from both the inside and the outside.

The laminated glass can, optionally, further include one or a plurality of additional functional layers, in particular polymeric functional layers, between the outer pane and the inner pane. Such additional functional layers are known in the sector. Usually, appropriate commercially available functional films are used as the starting material for forming the functional layers.

Examples of optional additional functional layers include acoustic layers or IR-reflecting layers. Here, as usual, IR is the acronym for infrared. If additional functional layers are included, they are preferably arranged between two lamination layers. The functional layers can have, for example, in each case, a thickness in the range from 0.04 to 1.5 mm, preferably 0.1 to 1.5 mm, more preferably from 0.3 to 0.9 mm.

Acoustic layers are composed, for example, of multiple, e.g., three, PVB layers, with a softer PVB layer contained in the center. Since the acoustic layers are also suitable as lamination layers, they can perform a dual function.

IR-reflecting layers are formed, for example, from a polymeric carrier layer and an IR-reflecting coating situated thereon. The polymeric carrier layer can, for example, be formed from polyester, polycarbonate, cellulose acetate, acrylate, or polyvinyl chloride. The IR-reflecting coating can, in principle, be implemented differently and preferably includes at least one silver layer. Commonly used are multiple layers with one or a plurality of silver layers as an actual functional layer, embedded between metallic and/or dielectric layers. As stated above, IR-reflecting coatings are conceivable additionally or preferably alternatively directly on the interpane or the outer pane, for which at least one silver layer or the multiple layers mentioned can be used.

In general, it is preferable for only one lamination layer to be present between the underlay and the pane bearing the design element. However, optionally, more than one lamination layer and/or one or plurality of functional layers can be arranged between the underlay and the pane bearing the design element, provided each of these layers is transparent. However, this is less preferable.

The laminated glass according to the invention is suitable in particular as a vehicle window or as building glazing. The laminated glass is particularly preferably a vehicle window, in particular an automobile window, e.g., a roof panel, a side window, a front window, or a rear window.

The invention further relates to a method for producing a laminated glass according to the invention as described above, the method comprising the following steps:

a) pictorial printing of a black ink onto a partial region of one side of a pane, by which means a design element 9 is formed from a black print having one or a plurality of unprinted regions,
b) providing an assembly, comprising, in this order, an outer pane 5, a first laminating film 8, a second laminating film 7, and an inner pane 6, wherein the pane obtained in step a) having the design element 9 is used for the outer pane 5 or the inner pane 6 and wherein an opaque, non-black piece of film is positioned between the two laminating films 7, 8 such that, in the finished laminated glass 18, it is placed underneath the unprinted region(s) 16 of the design element 9 as an underlay 10, and
c) heat treatment of the assembly obtained in step b) for laminating the assembly to form the laminated glass.

All the above indications regarding the laminated glass according to the invention apply mutatis mutandis to the method according to the invention.

The pictorial printing of the black ink can be carried out, for example, by screen printing, ink jet printing, or laser transfer printing, screen printing being preferred. Suitable as black ink are all customary inks, for example, ceramic ink or other printing inks, ceramic ink being preferred. Preferably, the pictorial printing is done by screen printing with black ceramic ink. If the design element is surrounded by a full-surface black print, which preferably runs around the side edge of the laminated glass, the pictorial print and the full-surface black print can be printed together in a single step, e.g., by screen printing.

Depending on the printing ink used for the design element, a heat treatment is, optionally, also necessary for baking the printing ink, in particular, when ceramic inks or enamel inks are used. The heat treatment for baking can be carried out, for example, at temperatures in the range from 400° C. to 700° C., preferably 550° C. to 650° C., in particular when the printing is done with a ceramic ink. The necessary heat treatment or the baking of the black print is usually carried out after printing and before assembling and laminating the laminated glass.

The opaque, non-black piece of film is, in step b), positioned between the two laminating films such that, in the finished laminated glass, it is positioned underneath the unprinted region(s) of the design element as an underlay.

In a preferred embodiment, the opaque piece of film is, in step b), pre-fixed after positioning on one of the two laminating films. This is preferably done by heat treatment, e.g., using a hot air blower. The positioning on and, optionally, pre-fixing of the opaque piece of film on a laminating film can be done before or after the laminating film has been placed on the assembly to be formed.

The preceding indications regarding to opaque piece of film apply mutatis mutandis to the underlay, in particular in terms of the dimensions, the thickness, and the type, such that reference is made to them here. Accordingly, the opaque piece of film is preferably a piece of PET film, in particular a piece of white PET film.

The lamination of the assembly is carried out using a thermal treatment, which can be carried out, for example, under atmospheric pressure, negative pressure, or positive pressure. The lamination of the assembly can be done, for example, in air or in a protective gas atmosphere. The person skilled in the art is well acquainted with the suitable methods and conditions.

The heat treatment of the assembly obtained in step b) for laminating the assembly is carried out according to the known standard procedures, e.g., at temperatures of not more than 200° C., e.g., in the range from 80 to 150° C.

The invention is further explained in the following using non-restrictive exemplary embodiments with reference to the accompanying drawings. The drawings are schematic and not to scale.

FIG. 1 depicts an example of a design element 9, in which the unprinted regions 16 in a black print 15 represent lettering and symbols. The design element is formed as a negative print. A white underlay (not shown) yields good contrast and good visibility.

FIG. 2 depicts an exploded view of a laminated glass 18 according to the invention, which has a design element 9 per FIG. 1. The laminated glass has an outer pane 5 and an inner pane 6, between which two lamination layers 7,8 are arranged. The two lamination layers 7, 8 are both clear PVB lamination layers, e.g., with a thickness in the range from approx. 0.3 to 0.9 mm. The design element 9 was printed, as an image, onto a partial region of the inner side 2 of the outer pane 5 (side 2). This was done by screen printing with a black ceramic ink. An opaque, white PET underlay 10 is arranged between the two lamination layers 7, 8 such that it is positioned underneath the unprinted regions of the design element 9. The dimensions of the underlay are smaller than the dimensions of the design element 9, but somewhat larger than would be required to underlay the unprinted regions of the design element 9. The dimensions of the design element can, for example, be approx. 200×300 mm; however, smaller or larger dimensions are equally possible. The thickness of the underlay is, for example, in the range from 20 to 70 µm, e.g., approx. 50 µm. The white underlay yields good contrast and good visibility for the design element.

FIG. 3 depicts an example of a design element with a symbol for a Wi-Fi function. The Wi-Fi symbol is represented by a black print surrounded by an unprinted region, which, in turn, is framed by a black print. A white underlay (not shown) yields good contrast and good visibility.

FIG. 4 depicts an exploded view of a detail of another laminated glass 18 according to the invention, showing only the partial region on which a design element is arranged. The design element 9 with a black print region 15 and an unprinted region 16 corresponds to the design element of FIG. 3, except that there is no Wi-Fi symbol in the interior. The detail of the laminated glass depicts a partial region of the outer pane 14 and a partial region of the inner pane 11, between which partial regions of two lamination layers 12, 13 are depicted. The two lamination layers 12, 13 are both PVB lamination layers, wherein the lamination layer 13 situated between the outer glass and the underlay is clear and the lamination layer 12 situated between the between the inner glass and the underlay is tinted. The design element 9 was printed as an image on the partial region of the outer glass and congruently on the partial region of the inner glass, more precisely, on the inner side of the outer pane 14 (side 2) and the inner side of the inner pane 11 (side 4). This was done in each case by screen printing with a black ceramic ink. An opaque, white PET underlay 10 is arranged between the partial regions of the two lamination layers 12, 13 such that it is positioned underneath the unprinted regions of the design element 9. The dimensions of the underlay 10 correspond to the dimensions of the design element 9. The thickness of the underlay 10 is, for example, in the range from 20 to 70 μm, e.g., approx. 50 μm. The white underlay yields good contrast and good visibility for the design element.

FIG. 5 depicts an oblique view of another laminated glass 18 according to the invention having three design elements 9 (plan view of the outer pane). The laminated glass has a full-surface black print 15 around the entire edge region of the laminated glass. The three design elements 9 are formed in the full-surface black print and surrounded thereby. The full-surface black print and the three design elements 9 were printed together in one step by screen printing with black ceramic ink on side 2 of the laminated glass. The central region of the laminated glass without black print is the through-vision region of the laminated glass. A full-surface black print can optionally be printed on the side 4 of the laminated glass pane congruently with the full-surface black print of side 2, but without design elements. The dotted outlines 17 around the design elements 9 are not actually dotted outlines, but are intended to indicate the position and dimension of the respective white underlay that is situated within the laminated glass and is not visible in this representation.

LIST OF REFERENCE CHARACTERS

1 outer side of the outer pane (side 1)
2 inner side of the outer pane (side 2)
3 outer side of the inner pane (side 3)
4 inner side of the inner pane (side 4)
5 outer pane
6 inner pane
7 second lamination layer
8 first lamination layer
9 design element
10 opaque underlay
11 partial region of the inner pane
12 partial region of the second lamination layer
13 partial region of the first lamination layer
14 partial region of the outer pane
15 black print
16 unprinted region
17 position of the underlay
18 laminated glass

The invention claimed is:

1. A laminated glass, comprising an outer pane, an inner pane, at least two lamination layers arranged between the outer pane and the inner pane, and at least one design element, wherein the design element is formed on a partial region of a pane side of the outer pane or the inner pane from a pictorial black print having one or a plurality of unprinted regions, and an opaque, non-black underlay is arranged between the two lamination layers, which underlay is placed underneath the unprinted region(s) of the design element, wherein the opaque, non-black underlay has a thickness in the range from 1 to 120 μm and is situated only in a partial region of the laminated glass.

2. The laminated glass according to claim 1, wherein the opaque, non-black underlay has a white color.

3. The laminated glass according to claim 1, wherein the opaque, non-black underlay is formed from polyethylene terephthalate.

4. The laminated glass according to claim 1, wherein the pane side on which the design element is printed is an inner side of the outer pane.

5. The laminated glass according to claim 1, wherein the lamination layer situated between the design element and the underlay is clear or tinted.

6. The laminated glass according to claim 1, wherein the design element is surrounded by a full-surface black print, wherein the full-surface black print is formed in an edge region of the laminated glass and runs around the entire edge region of the laminated glass.

7. The laminated glass according to claim 1, wherein one of the inner and outer panes that is opposite the other one of the inner and outer panes having the design element, has, in a position congruent with the design element, the same design element, a different design element, or a full-surface black print.

8. The laminated glass according to claim 1, wherein the two lamination layers are in each case a polyvinyl butyral (PVB) layer and/or one or a plurality of additional functional layers are arranged between the outer pane and the inner pane.

9. The laminated glass according to claim 1, wherein the black print of the design element is formed from a ceramic ink.

10. The laminated glass according to claim 1, which is a vehicle window or building glazing.

11. A method for producing of a laminated glass according to claim 1, comprising:
   a) pictorial printing of a black ink onto a partial region of one side of a pane, by which means a design element is formed from a black print having one or a plurality of unprinted regions,
   b) providing an assembly, comprising, in this order, an outer pane, a first laminating film, a second laminating film, and an inner pane, wherein the pane obtained in step a) having the design element is used for the outer pane or the inner pane and wherein an opaque, non-black piece of film is positioned between the two laminating films such that, in the finished laminated glass, it is placed underneath the unprinted region(s) of the design element as an underlay, and
   c) heat treatment of the assembly obtained in step b) for laminating the assembly to form the laminated glass.

12. The method according to claim 11, wherein the pictorial printing of the black ink is carried out by screen printing, ink jet printing, or laser transfer printing.

13. The method according to claim 11, wherein in step b), after positioning, the opaque piece of film is pre-fixed on a laminating film.

14. The method according to claim 11, wherein the positioning and, optionally, pre-fixing of the opaque piece of film on a laminating film is done before or after it has been arranged on the assembly to be formed.

15. The laminated glass according to claim 1, wherein the underlay has a thickness in the range from 20 to 70 μm.

16. The laminated glass according to claim 5, wherein the lamination layer situated between the design element and the underlay is clear.

17. The laminated glass according to claim 10, which is a vehicle window.

18. The method according to claim 12, wherein the pictorial printing of the black ink is carried out by screen printing.

19. The method according to claim 13, wherein in step b), after positioning, the opaque piece of film is pre-fixed on a laminating film by heat treatment.

\* \* \* \* \*